Patented Apr. 10, 1951

2,548,169

UNITED STATES PATENT OFFICE 2,548,169

STABILIZATION OF POLYVINYLIDENE CYANIDE SOLUTIONS

Floyd F. Miller, Akron, Ohio, assignor to The B. F. Goodrich Company, New York, N. Y., a corporation of New York No Drawing. Application May 17, 1949, Serial No. 93,816

8 Claims. (Cl. 260—45.7)

This invention relates to the stabilization of solutions containing a dissolved polymer of vinylidene cyanide, and relates particularly to the use of the oxides of sulfur for stabilizing the viscosity of solutions of polyvinylidene cyanide.

In a copending application, Serial No. 11,336, filed February 26, 1948, it is disclosed that vinylidene cyanide polymers having molecular weights in excess of 25,000 may be utilized in the preparation of polymer solutions which are extremely useful as spinning solutions and casting solutions from which are obtained filaments, films and the like, greatly superior to similar articles obtained from other polymers such as polyamides, polyvinylidene chloride and the like.

It has been found desirable, however, that polyvinylidene cyanide solutions be stabilized, so as to maintain a desired viscosity, since such solutions tend to become less viscous on standing, especially for long periods of time, probably because of degradation of the polymer chain.

Accordingly, it is an object of this invention to provide suitable materials for minimizing polymer chain degradation and maintaining the viscosity of vinylidene cyanide polymer solutions at the high level necessary for spinning and casting solutions.

I have discovered that the above object is accomplished by the use of the oxides of sulfur as stabilizers for polyvinylidene cyanide solutions. By the use of the stabilizers of this invention it is possible to maintain the viscosity of vinylidene cyanide polymer solutions within a range suitable for the spinning of excellent films and the casting of films, for long periods of time, so that the polymer solution need not be used as soon as it is made up, but may be stored in relatively large quantities and utilized as needed.

Sulfur dioxide, because of its availability, low cost and because of its great effectiveness, is the preferred oxide of sulfur for use as a stabilizer in polyvinylidene cyanide solutions. However, the other oxides of sulfur are also operative. Included among such other stabilizers are sulfur monoxide (SO), sulfur sesquioxide ($S_2O_3$), alpha-sulfur trioxide ($SO_3$), beta-sulfur trioxide ($SO_3)_2$, sulfur heptoxide ($S_2O_7$), sulfur tetraoxide ($SO_4$), and the like.

The stabilizing effect of the oxides of sulfur occurs regardless of the solvent used to dissolve the vinylidene cyanide polymer or the concentration of the polymer in the solution. Polymers of vinylidene cyanide possessing molecular weights in excess of 25,000 are at present known to be soluble in only a limited number of solvents, and are completely insoluble in a great number of the solvents commonly used to dissolve polymers. However, dimethyl formamide, tetramethylene sulfone and tetramethyl urea have been found to be excellent solvents for polyvinylidene cyanide and solutions of the polymer in such solvents, which solutions ordinarily contain from about 8 to 20% by weight of polymer, are of great value for spinning into fibers and casting into films.

The amount of stabilizer used is not critical and may be varied widely. In general, however, it is desirable that from 0.1% or less to 10% or more by weight of stabilizer be employed, with a particularly preferred range being from 0.1% to 5% by weight.

Likewise, no special conditions or precautions are necessary in adding the stabilizer to the polymer solution. For example, when sulfur dioxide, a gas under ordinary conditions, is used, the stabilization may be accomplished simply by bubbling the sulfur dioxide into the polymer solution for a few seconds, or when the oxide of sulfur is a liquid or a solid, the stabilized composition is prepared by adding the stabilizer to the polymer solution in the desired proportion, or in any other desired manner.

The following examples are intended to illustrate the use of the oxides of sulfur as stabilizers for polyvinylidene cyanide solutions in accordance with this invention but are not to be construed as a limitation upon the scope thereof, for there are, of course, numerous possible variations and modifications. In the examples all parts are by weight.

EXAMPLE I

A solution of polyvinylidene cyanide is prepared by adding 0.014 part of polyvinylidene cyanide to 4.965 parts of tetramethylene sulfone into which sulfur dioxide has been passed for five seconds. A control sample of the same concentration and containing no sulfur dioxide is also prepared. The viscosity of each solution is determined in an Ostwald type viscosimeter, as soon as possible after the solutions are prepared and again after a period of 25½ hours. The viscosities thus found are used in calculating the molecular weights of the polymers according to the following equation, the results being tabulated in Table I hereinbelow:

$$\text{Molecular weight} = \frac{Nsp}{KmC}$$

$$Nsp = \frac{\text{Viscosity of solution}}{\text{Viscosity of solvent}} - 1$$

$$Km = 1.5 \times 10^{-4}$$

$C$ = Concentration—moles of monomer per liter of solution.

Table I

| Time in Hours | Molecular Weight | |
|---|---|---|
| | Control | Solution Containing $SO_2$ |
| 0 | 96,700 | 163,000 |
| 25½ | 77,700 | 163,000 |

EXAMPLE II

Two samples of approximately 0.5% solutions of polyvinylidene cyanide in dimethyl formamide are prepared. To one of the samples is added 1% by weight of sulfur dioxide. The viscosities of the two solutions are determined at regular intervals up to 40 hours and the intrinsic viscosities at each period are calculated according to the following equation, with the results tabulated below:

$$\text{Intrinsic viscosity} = \frac{\log_e \frac{T_1}{T_0}}{C}$$

wherein $T_1$ = Viscosity of a dilute polymer solution
$T_0$ = Viscosity of the solvent in the same units and at the same temperature as $T_1$
$C$ = Grams of polymer per 100 ml. of solution

Table II

| Time in Hours | Intrinsic Viscosity | |
|---|---|---|
| | Control | Sample with 1% $SO_2$ |
| 0 | 2.92 | 5.30 |
| 1 | 2.35 | 5.13 |
| 2 | 2.05 | 5.00 |
| 4 | 1.70 | 4.85 |
| 10 | 1.40 | 4.68 |
| 24 | 1.10 | 4.33 |
| 40 | 1.00 | 3.95 |

EXAMPLE III

Three samples of approximately 0.3% solutions of polyvinylidene cyanide in tetramethylene sulfone are prepared. To one of the samples is added 2% by weight of sulfur dioxide and to a second sample 0.6% by weight of sulfur dioxide is added, the third sample being a control sample which contains no sulfur dioxide. From viscosity measurements taken at various intervals of time the molecular weight of the polymers is determined by the equation given hereinabove. The results are shown in Table III.

Table III

| Time in Hours | Molecular Weights | | |
|---|---|---|---|
| | Control | 0.6% $SO_2$ | 2% $SO_2$ |
| 0 | 55,900 | 169,000 | 232,000 |
| 18 | ----- | 162,000 | 223,000 |
| 24 | 23,700 | ----- | 206,000 |
| 48 | ----- | 160,000 | 202,000 |

The excellent stabilizing effect on polyvinylidene cyanide obtained by the use of sulfur dioxide is readily apparent from the specific examples. Of special significance is the fact that the sulfur dioxide prevents the very great original degradation which occurs as the polymer dissolves when no stabilizer is present and the fact that when sulfur dioxide is used the viscosity of the polymer solutions is maintained within the desired range for spinning and casting solutions for relatively long periods of time.

When other of the oxides of sulfur are utilized, the stabilizing effect on solutions of polyvinylidene cyanide is in general equivalent to that obtained with sulfur dioxide. Moreover solutions of other vinylidene cyanide polymers such as those prepared by copolymerizing vinylidene cyanide with other unsaturated monomers, particularly those containing a preponderant amount of vinylidene cyanide units, are also stabilized substantially as effectively by the oxides of sulfur as is the straight polyvinylidene cyanide.

Although specific examples of the invention have been herein described, it is not intended that the invention be limited thereto, for numerous variations and modifications will occur to those skilled in the art and are within the spirit and scope of the appended claims.

I claim:

1. A composition comprising a solution of a polymer of vinylidene cyanide stabilized with an oxide of sulfur.

2. A composition comprising a solution of polyvinylidene cyanide stabilized with sulfur dioxide.

3. A composition comprising a solution of polyvinylidene cyanide stabilized with from 0.1% to 10% by weight of sulfur dioxide.

4. A composition comprising a solution of polyvinylidene cyanide stabilized with from 0.1% to 5% by weight of sulfur dioxide.

5. A composition comprising a solution of polyvinylidene cyanide in dimethyl formamide, and as a stabilizer for said solution, sulfur dioxide.

6. A composition comprising a solution of polyvinylidene cyanide in tetramethylene sulfone and, as a stabilizer for said solution, sulfur dioxide.

7. A composition comprising a solution of polyvinylidene cyanide in dimethyl formamide and, as a stabilizer for said solution, from 0.1% to 5% by weight of sulfur dioxide.

8. A composition comprising a solution of polyvinylidene cyanide in tetramethylene sulfone and, as a stabilizer for said solution, from 0.1% to 5% by weight of sulfur dioxide.

FLOYD F. MILLER.

REFERENCES CITED

The following references are of record in the file of this patent:

UNITED STATES PATENTS

| Number | Name | Date |
|---|---|---|
| 2,404,728 | Finzel | July 23, 1946 |
| 2,466,395 | Dickey | Apr. 5, 1949 |